United States Patent [19]

Hindström

[11] Patent Number: 4,863,656
[45] Date of Patent: Sep. 5, 1989

[54] MICROPOROUS PLATE AND METHOD FOR MANUFACTURING THE SAME AND SUCTION DRIER APPARATUS

[75] Inventor: Rolf Hindström, Turku, Finland

[73] Assignee: Valmet Oy, Finland

[21] Appl. No.: 205,296

[22] Filed: Jun. 10, 1988

Related U.S. Application Data

[62] Division of Ser. No. 937,395, Dec. 3, 1986.

[51] Int. Cl.[4] .................. B01D 33/02; B28B 1/26; C04B 33/34; C04B 38/00
[52] U.S. Cl. ........................ 264/62; 210/331; 210/486; 210/510.1; 264/86; 264/112; 264/DIG. 48
[58] Field of Search .......... 264/86, 112, 122, 126, 264/301, 302, DIG. 48, 87; 210/331, 486, 510.1; 34/9, 95, 92, 80, 81

[56] References Cited

U.S. PATENT DOCUMENTS

| | | | |
|---|---|---|---|
| 2,877,903 | 3/1959 | Veres | 210/510.1 X |
| 2,963,158 | 12/1960 | Jung | 210/174 |
| 2,978,108 | 4/1961 | Strassheim | 210/486 |
| 3,984,044 | 10/1976 | Breton et al. | 210/510.1 X |
| 4,243,536 | 1/1981 | Prölss | 210/331 X |
| 4,252,759 | 3/1981 | Yannas et al. | 264/86 |
| 4,381,998 | 5/1983 | Roberts et al. | 210/510.1 X |
| 4,686,776 | 8/1987 | Matsubara | 34/95 |
| 4,689,150 | 8/1987 | Abe et al. | 210/510.1 X |
| 4,698,157 | 10/1987 | Gillot | 210/510.1 X |
| 4,724,078 | 3/1988 | Auriol et al. | 210/510.1 X |

FOREIGN PATENT DOCUMENTS

| | | | |
|---|---|---|---|
| 27477 | 4/1981 | European Pat. Off. | 264/126 |
| 268058 | 12/1913 | Fed. Rep. of Germany | 210/402 |

Primary Examiner—Jan H. Silbaugh
Assistant Examiner—Karen D. Kutach
Attorney, Agent, or Firm—Steinberg & Raskin

[57] ABSTRACT

A method for manufacturing a microporous plate, a filter plate obtained from the method, and suction drier apparatus utilizing such filter plates. According to the method, a casting mix is introduced into the interior of a gypsum mold whereupon water is absorbed from the casting mix into the gypsum so that a crust remains on the inner surface of the mold. The crust is allowed to develop to an appropriate thickness whereupon the remaining casting mix is drained from the mold. The inner surfaces of the crust are allowed to dry whereupon the interior space defined between opposed crust wall portions is filled with a granular material which preferably has the same composition as the crust material. A filter plate comprises a pair of opposed suction walls defining an interior space between them which is filled with a granular material. The suction drier apparatus includes at least one of the filter plates which is mounted to be moved into and out of a basin or the like in which material to be dewatered is present. In one embodiment, the suction drier apparatus includes several filter plates mounted in a circular array around a rotating shaft. A negative pressure is applied to the suction walls of each plate whereby water or other liquid is suctioned from the material to be dewatered through the suction walls into the interior space within the filter plate and then drawn under the negative pressure out of the plate structure.

15 Claims, 3 Drawing Sheets

MICROPOROUS PLATE AND METHOD FOR MANUFACTURING THE SAME AND SUCTION DRIER APPARATUS

This is a division of application Ser. NO. 937,395, filed 12/3/86.

BACKGROUND OF THE INVENTION

The present invention relates generally to a method for manufacturing a microporous plate and, more particularly, to a method for manufacturing a filter plate.

The invention also relates to filter plates and suction drier apparatus which incorporate such filter plates.

Microporous plates are used for various applications. In U.S. Pat. No. 4,357,758 which is assigned to applicant's assignee and the diclosure of which is hereby incorporated by reference herein, a method is disclosed for dewatering porous materials, web-like materials such as paper, loose materials such as peat, and solid material such as wood. Filter plates are also disclosed in said patent which are used in the dewatering method. The method disclosed in said patent includes bringing the material to be dewatered into hydraulic connection with a liquid maintained at a negative pressure with respect to the material to be dewatered by means of a microporous suction wall which is filled with liquid which is interposed between the material and the liquid under negative pressure.

Finnish Pat. No. 67,180, assigned to applicant's assignee, discloses a filter plate method for manufacturing the same. The filter plate disclosed in said Finnish patent is manufactured by an extrusion method.

SUMMARY OF THE INVENTION

An object of the present invention is to provide new and improved microporous filter plates which are advantageous in manufacture and which include microporous suction walls which are extremely thin but which are relatively strong.

Another object of the present invention is to provide new and improved methods for manufacturing filter plates.

A further object of the present invention is to provide new and improved suction drier apparatus by which materials to be dewatered are dried in an efficient manner through the use of the filter plates constructed in accordance with the invention.

A still further object of the present invention is to provide new and improved filter plates and suction drier apparatus incorporating such filter plates which are suitable, for example, for the dewatering of peat. In the dewatering of materials such as peat, the filter plates must have very large surface areas so that a further object of the invention is the manufacture of filter plates having large surface areas.

The method of the invention enables the manufacture of filter plates which include suction walls having a length-to-thickness ratio exceeding 120. In other words, it is possible using the method of the invention to manufacture large, thin suction walls for the filter plate from appropriate material, such as ceramic. The method does not restrict the particular shape of the filter plate. For example, the plate may be manufactured with a rectangular or circular-sector shape.

It should also be noted that the method of the invention is not restricted to the manufacture of filter plates although the use of the plates so manufactured as filter plates comprises the most advantageous embodiment of the method.

Briefly, a method in accordance with the invention comprises filling a mold formed of gypsum or equivalent absorbent material with a casting mix. Water from the casting mix is absorbed into the mold material whereby a solid crust having opposed crust wall portions is formed on the inner surfaces of the mold. The crust is allowed to develop to an appropriate thickness whereupon the remaining casting mix is drained from the interior space defined between the opposed crust wall portions. The interior space between the opposed crust wall portions is then filled with a granular material.

A filter plate in accordance with the invention comprises a pair of opposed suction walls defining an interior space between them which is filled with a granular material. The filter plate is adapted to be brought into connection with the matrial to be dewatered. The liquid in the material to be dewatered flows out of the material through the suction walls into the interior space defined between the suction walls and then out of the filter plate.

Suction drier apparatus in accordance with the invention includes at least one filter plate of the type described above which is mounted so as to be movable into connection with material to be dewatered present in a basin or the like whereupon the filter plate is moved out of the basin while negative pressure is applied to the suction walls of the filter plate.

In the method of the inventio, a mold formed of gypsum or other equivalent absorbent material is used. The mold is preferably composed of two parts and is advantageously filled with a casting mix, preferably a mixture of a ceramic material and water. The water is absorbed from the mix into the mold whereby a thin crust composed of two opposed crust wall portions remains on the inner surfaces of the mold. After the crust has been developed to an appropriate thickness, the excess casting mix is drained. After the opposed crust wall portions have dried, the interior space defined between the opposed crust wall poritons is filled with a granular material preferably having the same dry solid composition as that of the casting mix. The method of the invention further includes the additional steps of drying and heating the plates.

Filter plates are obtained by the method of the invention which are constituted by large, thin walls, having length-to-thickness ratios in excess of 120. The length-to-thickness ratio of the finished double-walled plate may be in excess of about 30 and the shape of the plate is not restricted and may comprise, for example, a circular sector in which case it is especially suited for use in a suction drier apparatus constructed in accordance with the invention. The interior space between the opposed walls which is filled with granular material acts to reinforce the structure of the plate. However, the granular material does not prevent the suction of liquid from the interior space when the latter is filled with water. The suctioning of liquid from the interior space takes place by maintaining the liquid within the interior space at a negative pressure as desribed below.

Filter plates manufactured in accordance with the method of the invention can be advantageously used, for example, in the dewatering of peat. Suction drier apparatus for use in this connection comprises at least one filter plate of the type described below which is mounted so as to be passed into connection with the material to be dewatered which is present, for example, in a sludge basin. The filter plates are preferably mounted in a circular array in which case the filter plates have the shape of a circular sector. The circular array of filter plates revolves around a central axis so that at least one of the plates is always present within the sludge basin. The suction drier apparatus will be described in greater detail below.

DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 1:
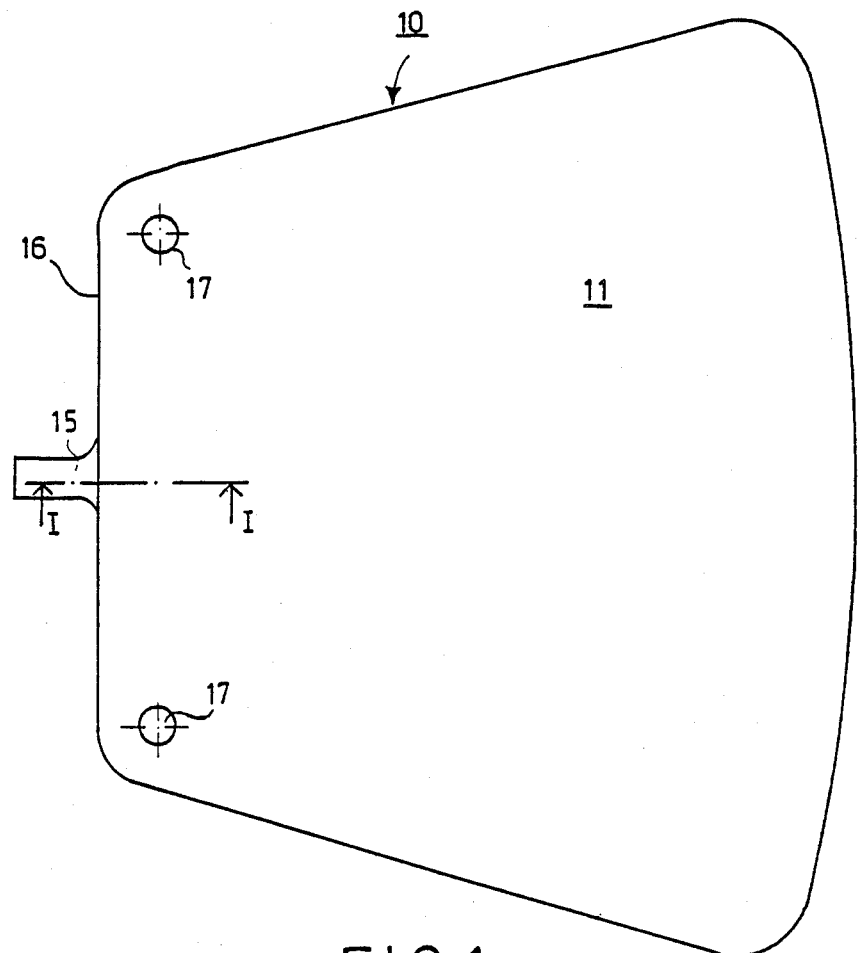
FIG. 1 is a top plan view of a filter plate in accordance with the present invention.

A method in accordance with the invention for manufacturing microporous plates will first be described with reference to FIGS. 4–7. A mold having mold walls preferably formed of gypsum or similiar absorbent material comprises two parts 201 and 202. With the mold parts 201 and 202 held together and with the mold being maintained in an upright position so that the neck of the mold is directed downwardly, the mold is filled with a casting mix comprising a casting material mixed with water. After introducing the casting mix into the mold, the water of the casting mix is absorbed into the mold walls whereupon a thin crust forms on the inner surfaces of the mold walls. The crust so formed includes a pair of opposed crust wall portions 11a and 12a (FIG. 6) defining a space 14a between them. After waiting an appropriate time for the crust wall portions to develop to an appropriate thickness, such as about 30 minutes, the excess casting mix is drained from the interior space 14a between the crust wall portions. The crust wall portions are allowed to dry by waiting an appropriate time, such as about 30 minutes. The interior space 14a between the dried crust wall portions 11a amd 12a is then filled with a granular material 13 which preferably has the same dry solid composition as that of the casting mix. After the interior space has been so filled with granular material, the granules are washed with a thin sludge formed of the same casting mix. The thin sludge penetrates into the spaces between the granules and interconnects the granules with each other as well as with the walls formed by the dried crust. A time of about 15 seconds is allowed to elapse whereupon the sludge is emptied from the interior space between the walls. The emptying opening is then tightly closed with a strip of the casting mix.

Figure 7:
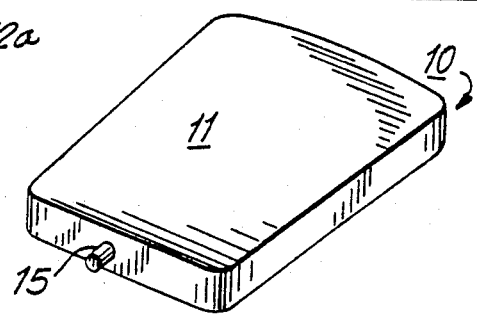
FIG. 7 is a perspective view of a filter plate manufactured by a method of the invention using the mold shown in FIGS. 4–6.

The plate 10 formed in the manner described above is detached from the inner surfaces of the mold walls whereupon the mold is open and the plate cleaned of casting overflow (FIG. 7). The plate is then allowed to dry slowly for about two hours. During the casting stage, a water duct 15 is formed which communicates with the central interior space defined between the opposed plate walls so that water that has entered into the central interior is suctioned from the plate through the water duct. After drying, the water duct and the edges of the plate are glazed.

After the glazing step, the plate is heated in an oven. In particular, the temperature of the oven is slowly raised to a maximum of about 1320° C. over a period of about 48 hours. The maximum temperature is maintained for about two hours.

The method described above is advantageously suitable for the manufacture of microporous filter plates which are intended for use as a porpous material in suction drying in which the material to be dewatered is brought into hydraulic connection with a liquid maintained at a negative pressure with respect to the material being dewatered through the intermediate of the microporous suction walls of the suction plate. However, it is understood that the plates manufactured by the method of the invention may be used for other applications besides filter plates.

Figure 2:
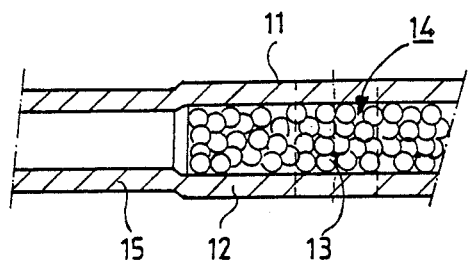
FIG. 2 is a partial sectional view taken along line I—I of FIG. 1.

Referring now to FIGS. 1 and 2, a filter plate in accordance with the invention is illustrated. The filter plate, generally designated 10, comprises a first suction wall 11 and an opposed second suction wall 12. An interior space 14 is defined between the opposed first and second suction walls 11 and 12. The intermediate space 14 is adapted to be filled with water which is then maintained at a negative pressure in connection with a suction drying operation of the type described above. The interior space 14 is filled with a granular material 13 which acts as a reinforcement for the structure of the plate. Due to its granular nature, the material 13 does not prevent the flow of liquid that enters into the central interior space 14 since the granular material does not present a major resistance to liquid flow. The water duct 15 passes into the central interior space 14. The duct 15 is adapted to be connected to a source of negative pressure so as to maintain liquid contained within the interior space 14 at a negative pressure and so as to produce a flow of liquid through the suction walls 11 and/or 12 into the central interior space 14 and then out of the filter plate 10.

The duct 15 of plate 10 as well as the edges 16 of the plate are preferably reinforced by means of glazing.

The plate 10 may be provided with fastening openings 17 which function as means for attaching the plate 10 to mounting means in suction drier apparatus as descried below. The granular material 13 contained within the central interior space 14 acts to support the suction walls 11 and 12 against collapsing under the negative pressure maintained within the central interior space 14.

The suction walls 11 and 12 of plate 10 and the granular material 13 are preferably made of the same ceramic casting mix having a composition of about 20% clay, about 30% kaolin, about 45% aluminum hydroxide, and about 5% calcium carbonate.

The average size of the particles of the raw material of the ceramic casting mix is about 0.002 mm. The ceramic casting mix preferably has the following physical properties: a specific weight of about 1750 kg/m$^3$, a viscosity of about 1000 cp, and a water content of less than about 33%. The granular material 13 in the interior space 14 of plate 10 is preferably made of the same porous material as the suction walls 11 and 12. Thus, the finished plate comprises a porous ceramic material having the following composition: about 55% aluminum hydroxide, about 40% silicon dioxide, and about 5% calcium oxide. The average particle size is preferably in the range of between about 0.0010 to 0.0015 mm.

Moreover, dispersing agents, such as sodium polyacrylate, are preferably used as additives in order to obtain the desired composition.

Figure 3:
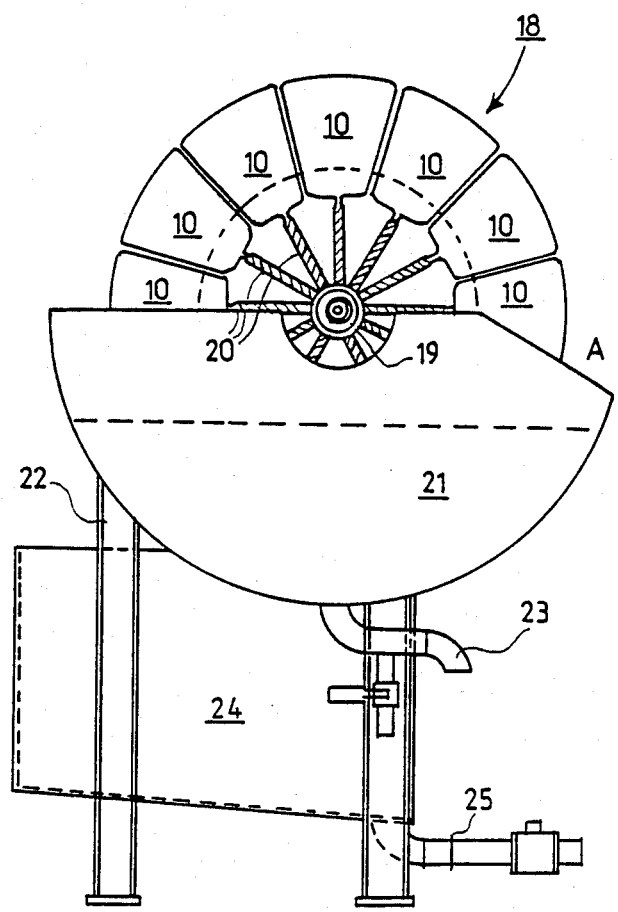
FIG. 3 is a front elevation view of suction drier apparatus in accordance with the invention, wherein filter plates in accordance with the invention are used.
Figure 4A:
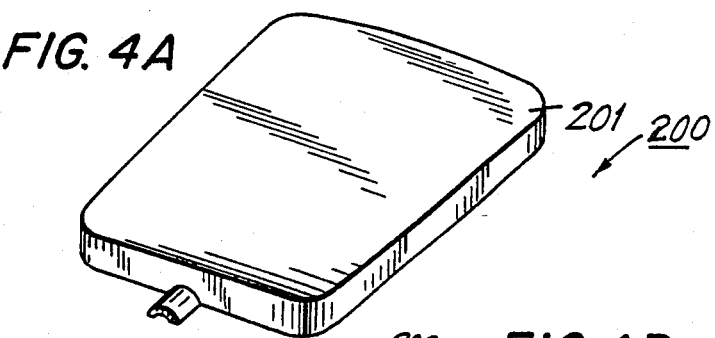
FIGS. 4a and 4b are perspective views of mold parts of a mold for use in a method of the present invention.
Figure 4B:
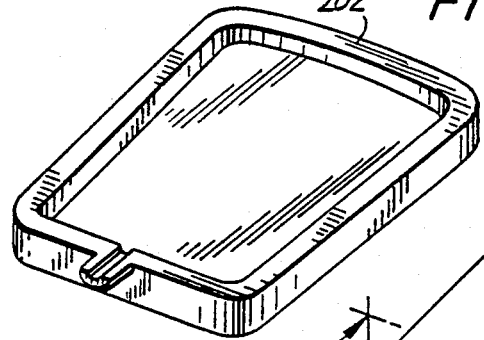
Figure 5:
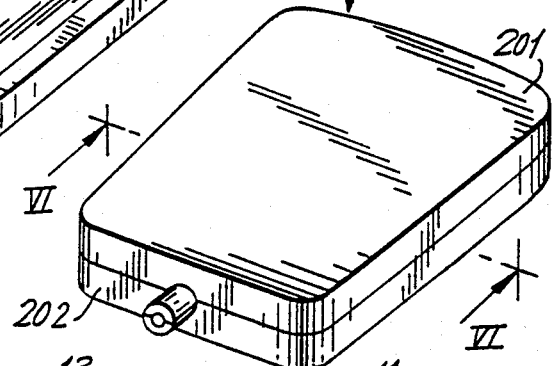
FIG. 5 is a perspective view of the mold during the manufacture of a filter plate in accordance with the invention.
Figure 6:
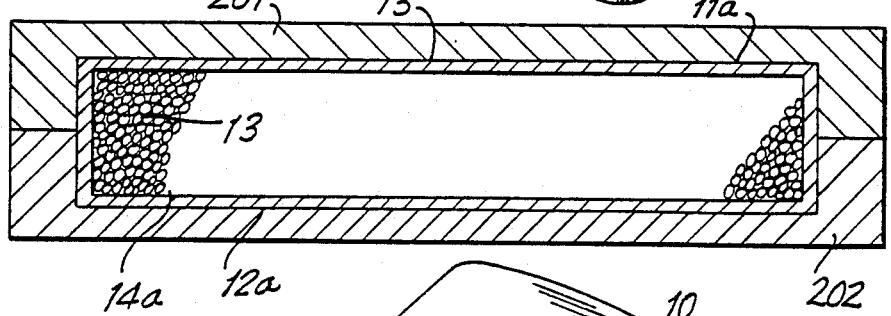
FIG. 6 is a section view taken along line VI—VI of FIG. 5.

Referring now to FIG. 3, suction drier apparatus in accordance with the invention are illustrated and generally designated 18. The drier apparatus 18 preferably comprises a plurality of filter plates 10, advantageously manufactured by the method of the invention. The plates 10 are mounted in a circular array so that the water duct 15 of each filter plate 10 is connected to a central suction tube 19 situated on a central rotating shaft. Each filter plate 10 has a circular-sector shape and is connected by a duct 20 through duct 15 to the central suction tube 19. A basin 21 is situated so that as the circular array of filter plates 10 rotate, each of the plates 10 move into and through the basin 21. The basin 21 may be filled with peat sludge or other similar material to be dewatered. The central suction tube 19 is connected to a source of suction so that the interiors of the filte plates 10 are maintained at a negative pressure through the central tube 19 and ducts 20. Due to the porous nature of the suction walls 11 and 12 of the filter plates 10, the sludge contained in basin 10 adheres to each plate 10 as it moves into the basin under the effect of the negative pressure applied to the central interior space 14 of the filter plate. The water in the sludge is suctioned under the effect of the negative pressure through the suction walls 11 and 12 of filter plates 10 into the central interior space 14 and then along the ducts 20 into the central tube 19 and then out of the suction drier apparatus.

As noted above, each filter plate 10 moves into the basin 21 and as the rotating shaft continues to revolve, the filter plate rises out of the basin. The material to be dewatered adheres to the suction walls 11 and 12 of the plates and tends to rise out of the basin along with the filter plates 10. Since the negative pressure is continuously maintained, dewatering of the material continues as each filter plate rises out of the basin 21. When the material to be dewatered, e.g. peat, has been carried to a certain defined point, designated A in FIG. 3, scraper blades (not shown) or other detaching members detach or scrape the material being dewatered from the suction walls 11 and 12 and the dewatered material is separated from the plates 10 and other drier apparatus 18. The drier apparatus 18 further includes a support frame 22 which serves to support the basin 21. The basin 21 is also provided with an outlet pipe 23. The drier apparatus 18 further includes a storage tank 24 for the material being dewatered, the storage tank itself being provided with an outlet duct 25. The central rotating shaft and suction tube 19 are rotated by conventional means, such as an electric motor.

During the operation of the suction drier apparatus 18, the suction walls 11 and 12 of the filter plates 10 remain saturated with liquid at all times so that air or any gas in general will not pass through the suction walls due to the pressure differential which is maintained. During operation of the suction drier apparatus 18, the material being dewatered is brought into hydraulic communication with a liquid being maintained at a negative pressure with respect to the material being dewatered through the intermediate of the suction walls 11 and/or 12 of the microporous plate 10. The apparatus of the invention is particularly suited for the dewatering of peat but it is understood that the apparatus is also suitable for dewatering of many other materials. It should also be understood that the liquid being suctioned by the apparatus from the material being dewatered may comprise a liquid other than water.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A method of manufacturing a microporous plate, particularly useful as a filter plate, comprising the steps of:
   preparing a casting mix by adding water to a casting material;
   introducing the casting mix into an interior of a casting mold having opposed mold walls formed of an absorbent material;
   allowing water of the casting mix to be absorbed into the walls of the casting mold until a solid crust is formed from the casting mix on inner surfaces of the opposed mold walls, the crust comprising opposed porous crust wall portions defining an interior space between them;
   draining the casting mix remaining within the interior space between the opposed crust wall portions upon the crust wall portions having developed an appropriate thickness; and
   filling the interior space within the crust wall portions with a granular material to provide reinforcement for the crust wall portions and form the microporous plate.

2. The method of claim 1 wherein the casting mold walls are formed of gypsum.

3. The method of claim 1 wherein the granular material is formed of the same material as the material of which the crust is formed.

4. The method of claim 1 wherein the casting material from which the crust is formed also includes dispersing agents.

5. The method of claim 1 wherein the casting material comprises a material having a specific weight of about 1750 kg/m$^3$, a viscosity of about 1000 cP and a water content of less than about 33%.

6. The method of claim 1 including the further step of washing the interior space between the opposed crust wall portions and the granular material filling the interior space with a sludge material.

7. The method of claim 6 wherein the sludge material and the granular material are formed of the same material as the material of which the crust is formed.

8. The method of claim 1 wherein the granular material is formed of the same material as the material of which the crust is formed, the material comprising a ceramic material.

9. The method of claim 8 wherein the plate in finished form comprises about 55% aluminum hydroxide, about 40% silicon dioxide, and about 5% calcium oxide.

10. The method of claim 1 wherein the mold has a filling opening and the crust formed in the mold further comprises crust duct portions defining a water duct communicating with the interior space between the opposed crust wall portions, and including the further steps of:
- after forming the microporous plate, closing the filling opening of the mold with a strip formed of the casting mix;
- detaching the microporous plate from the inner surfaces of the opposed mold walls;
- opening the mold;
- allowing the plate to dry;
- glazing the water duct and edges of the plate; and
- heating the plate in an oven.

11. The method of claim 10 wherein the heating step comprises raising the temperature of the oven slowly to a high temperature of about 1320° C. and maintaining the high temperature for about two hours.

12. The method of claim 11 wherein the heating step has a duration of about 48 hours.

13. The method of claim 1 wherein the casting material from which the crust is formed comprises clay, kaolin, aluminum hydroxide and calcium carbonate.

14. The method of claim 9 wherein said casting material comprises about 20% clay, about 30% kaolin, about 45% aluminum hydroxide, and about 5% calcium carbonate.

15. The method of claim 14 wherein the casting material is formed of raw material in particulate form, the particles of raw material having an average size of about 0.002 mm.

* * * * *